Patented Feb. 28, 1928.

1,660,651

UNITED STATES PATENT OFFICE.

JOHN MARSHALL, OF SWARTHMORE, PENNSYLVANIA, AND FRANK H. BERGEIM, OF WOODBURY, NEW JERSEY, ASSIGNORS TO E. I. DU PONT DE NEMOURS & COMPANY, OF WILMINGTON, DELAWARE, A CORPORATION OF DELAWARE.

NITRATION PROCESS.

No Drawing. Application filed December 31, 1926. Serial No. 158,404.

This invention relates to a process for nitrating solid polyhydroxy alcohols.

In general, the nitration of solid polyhydroxy alcohols in the past has been carried out by dissolving the alcohol in some other material to be nitrated as, for example, by dissolving cane sugar in glycerine, nitrating such solutions with mixed acid, and utilizing the mixed product of nitration without separation into its components. In other cases, the solid polyhydroxy alcohol has been added directly to mixed acid, and in yet other cases the alcohol has been nitrated by dissolving it in nitric acid and by precipitating the nitrated product from solution by the addition of sulfuric acid.

All of these methods are unsatisfactory for various reasons. The first method mentioned makes it extremely difficult to obtain the nitration product of the solid polyhydroxy alcohol in a pure condition; the second method in many cases as, for example, when nitrating pentaerythrite, produces a partially nitrated product and gives very poor yields, and the product is in such condition that the removal of residual acid from the product is most difficult; the third method offers serious hazards in that a solution of an organic material in nitric acid is itself an explosive and is dangerous to handle.

It is one of the objects of this invention to provide a safe and economical method for nitrating solid polyhydroxy alcohols, which method does not have the disadvantages and dangers of the methods commonly used. Other objects will be apparent from the description of the invention.

The method of the present invention provides for the nitration of solid polyhydroxy alcohols, and comprises dissolving the alcohol in sulfuric acid and nitrating said alcohol by adding the sulfuric acid solution to nitric acid, which, if desired, may contain some sulfuric acid.

As a specific example of the manner in which our process may be carried out, the following procedure may be cited: One part of pentaerythrite, $C(CH_2OH)_4$, is dissolved in six and one-half parts of concentrated sulfuric acid (90–95% strength). After all the pentaerythrite has been dissolved, the sulfuric acid solution is added slowly to six parts strong nitric acid (90–100%), keeping the temperature of the nitrated mixture between about 40° and 60° C. Instead of strong nitric acid, we may use, with equally good results, a mixed acid of relatively low sulfuric acid content, for example, 80% $HNO_3$, 12% $H_2SO_4$ and 8% $H_2O$. After addition of the sulfuric acid solution to the nitric acid is completed, the mixture is agitated for a short period, for example, one-half hour in order to insure completeness of reaction, after which the crystalline pentaerythrite nitrate may be separated from the waste acid by filtration or by drowning in water. The crystalline product is washed free from acid by means of successive treatments with water and dilute alkali solution, after which it is further purified by dissolving it in acetone, neutralizing any traces of residual acid, and precipitating the purified product from solution by addition to water. The solid product is then recovered by filtration, and dried. The acetone content in the filtrate is available for recovery by the usual methods.

We have found that the present method of nitrating solid polyhydroxy alcohols is applicable in a general way to all of those solid polyhydroxy alcohols which may be dissolved in sulfuric acid without decomposition, as for example, glucose, levulose, mannitol, etc. Wherever the term "solid polyhydroxy alcohol" is used, it is intended to include, in addition to the straight alcohols, such related substances as the aldoses and the ketoses.

In general, sulfuric acid of 90–95% strength is preferred for dissolving the alcohol, but it is understood that the sulfuric acid strength may be varied quite widely. As the strength of the sulfuric acid is reduced, it has been found that the yield is usually diminished. On the other hand, when the sulfuric acid is stronger than 95%, there is a greater tendency toward carbonization of the alcohol and the process is more difficult to control.

As has been pointed out, the nitration is carried out by adding the sulfuric acid solutions of such solid alcohols to strong nitric acid or to a mixture of nitric acid with a relatively small proportion of sulfuric acid. By carrying out the nitration according to the present invention, it is possible to nitrate the solid alcohol at temperatures considerably higher than those which are possible by the usual methods of nitration, and it has been found that the control of temperature during the course of the nitration reaction is comparatively simple, in that a large portion of the heat of reaction has been taken up during the formation of the sulfuric acid solution. The nitration operation is economical and substantially free from the usual dangers met with in previous similar nitrating processes.

While the nitration operation has been described in some detail, it is understood that many changes may be made in the methods set out specifically; for example, the temperature of nitration can be varied over a large range and the proportions of acids to alcohol may be varied greatly.

Any other suitable and desired changes may be made in carrying out the invention without departing from the spirit and scope thereof.

We claim:

1. A process for the nitration of a solid polyhydroxy alcohol which comprises dissolving the alcohol in sulfuric acid and adding the solution so prepared to nitric acid.

2. The process of claim 1 in which the sulfuric acid is of 90–95% strength.

3. The process of claim 1 in which the nitric acid contains sulfuric acid.

4. The process of claim 1 in which the nitric acid is of about 90% strength.

5. A process for the nitration of a solid polyhydroxy alcohol, which comprises dissolving the alcohol in sulfuric acid and adding this solution to nitric acid, maintaining the temperature of the mixture at about 40°–60° C. until nitration of the alcohol is substantially complete.

6. A process for the nitration of pentaerythrite, which comprises dissolving the pentaerythrite in sulfuric acid and adding this solution to nitric acid.

7. A process for the nitration of pentaerythrite, which comprises dissolving the pentaerythrite in 90–95% sulfuric acid and adding this solution to nitric acid.

8. A process for the nitration of pentaerythrite, which comprises dissolving the pentaerythrite in 90–95% sulfuric acid and adding this solution to 90% nitric acid.

9. A process for the nitration of pentaerythrite, which comprises dissolving the pentaerythrite in 90–95% sulfuric acid and adding this solution to 90% nitric acid, maintaining the temperature of the mixture at about 40–60° C. until nitration of the pentaerythrite is substantially complete.

10. The process of claim 6 in which the nitric acid contains sulfuric acid.

In testimony whereof we affix our signatures.

JOHN MARSHALL.
FRANK H. BERGEIM.